(12) United States Patent
Katayama et al.

(10) Patent No.: US 10,621,870 B2
(45) Date of Patent: *Apr. 14, 2020

(54) SURROUNDING AREA MONITORING SYSTEM

(71) Applicant: Mitsubishi Electric Corporation, Tokyo (JP)

(72) Inventors: Masahiko Katayama, Tokyo (JP); Tetsuji Haga, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/056,782

(22) Filed: Aug. 7, 2018

(65) Prior Publication Data

US 2018/0374362 A1 Dec. 27, 2018

Related U.S. Application Data

(63) Continuation of application No. 15/110,304, filed as application No. PCT/JP2014/061996 on Apr. 30, 2014, now Pat. No. 10,380,895.

(51) Int. Cl.
*G08G 1/16* (2006.01)
*G08G 1/123* (2006.01)
(Continued)

(52) U.S. Cl.
CPC ............. *G08G 1/166* (2013.01); *B60R 1/00* (2013.01); *G06K 9/00597* (2013.01);
(Continued)

(58) Field of Classification Search
CPC .. G08G 1/166; G08G 1/123; B60R 2300/802; B60R 2300/804
(Continued)

(56) References Cited

U.S. PATENT DOCUMENTS 5,556,281 A * 9/1996 Fitzgerald ................. F41G 3/26
434/11
5,572,484 A * 11/1996 Gaus ....................... B60Q 9/007
180/167

(Continued)

FOREIGN PATENT DOCUMENTS

CN 102712285 A 10/2012
JP 2-224637 A 9/1990
(Continued)

OTHER PUBLICATIONS

International Search Report of PCT/JP2014/061996, dated Jul. 22, 2014. [PCT/ISA/210].
(Continued)

*Primary Examiner* — Zaihan Jiang
(74) *Attorney, Agent, or Firm* — Sughrue Mion, PLLC; Richard C. Turner

(57) ABSTRACT

A surrounding area monitoring apparatus receives visual field information about a driver of a surrounding vehicle of a self vehicle, and decides whether the self vehicle is outside the visual field of the surrounding vehicle or not in accordance with the visual field information. Accordingly, it can learn the present dynamic visual field range of the driver of the surrounding vehicle actually traveling around the self vehicle, and obtain more accurate visual field range. Thus, it can appropriately give information that is really necessary and suppress giving unnecessary information.

3 Claims, 17 Drawing Sheets

(51) Int. Cl.
*G06K 9/00* (2006.01)
*B60R 1/00* (2006.01)

(52) U.S. Cl.
CPC ......... *G06K 9/00845* (2013.01); *G08G 1/123* (2013.01); *G08G 1/163* (2013.01); *G08G 1/167* (2013.01); *B60R 2300/406* (2013.01); *B60R 2300/50* (2013.01); *B60R 2300/802* (2013.01); *B60R 2300/804* (2013.01)

(58) Field of Classification Search
USPC ......................................................... 348/148
See application file for complete search history.

(56) References Cited

U.S. PATENT DOCUMENTS

| | | | |
|---|---|---|---|
| 6,038,502 A * | 3/2000 | Sudo .................... | G01S 13/931 180/167 |
| 6,057,754 A | 5/2000 | Kinoshita et al. | |
| 9,623,869 B2 | 4/2017 | Matsuno | |
| 2006/0070787 A1* | 4/2006 | Bartels ................. | G01S 13/931 180/271 |
| 2008/0231703 A1* | 9/2008 | Nagata .................. | H04N 7/181 348/148 |
| 2009/0150768 A1 | 6/2009 | Bae et al. | |
| 2010/0078962 A1 | 4/2010 | Kronenberg | |
| 2010/0082179 A1 | 4/2010 | Kronenberg | |
| 2011/0029235 A1 | 2/2011 | Berry | |
| 2012/0268262 A1* | 10/2012 | Popovic ................ | B60Q 9/008 340/438 |
| 2013/0060456 A1 | 3/2013 | Pourparhizkar | |
| 2013/0078063 A1 | 3/2013 | Shani | |
| 2013/0083197 A1 | 4/2013 | Yamakage et al. | |

FOREIGN PATENT DOCUMENTS

| | | |
|---|---|---|
| JP | 2009-48564 A | 3/2009 |
| JP | 2009-187424 A | 8/2009 |
| JP | 2013-206183 A | 10/2013 |
| WO | 2011/148455 A1 | 12/2011 |

OTHER PUBLICATIONS

Communication dated Mar. 5, 2019, from the State Intellectual Property Office of People's Republic of China in counterpart Application No. 201480078331.5.

Communication dated Jul. 4, 2018 issued by the State Intellectual Property Office of People's Republic of China in counterpart application No. 201480078331.5.

Communication dated Sep. 20, 2019 from the State Intellectual Property Office of the P.R.C. in counterpart Application No. 201480078331.5.

* cited by examiner

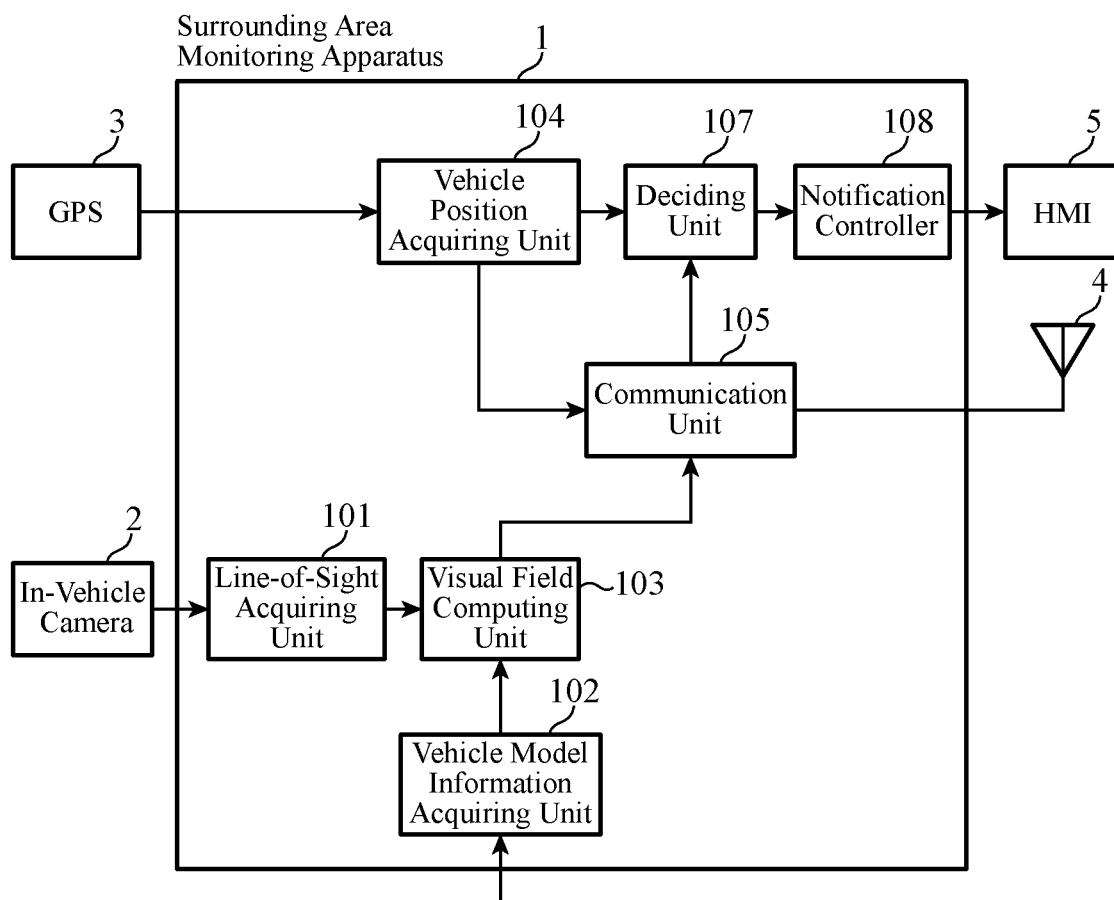

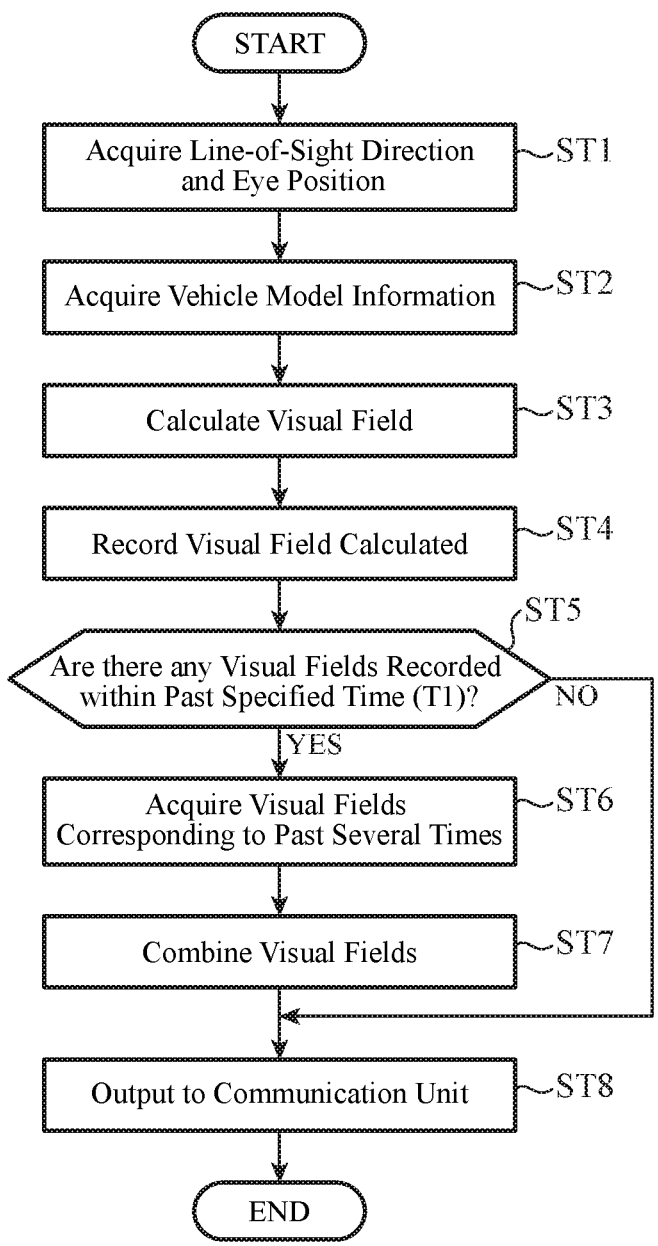

FIG.4

| (-3,-3) | (-2,-3) | (-1,-3) | (0,-3) | (1,-3) | (2,-3) | (3,-3) |
|---|---|---|---|---|---|---|
| (-3,-2) | (-2,-2) | (-1,-2) | (0,-2) | (1,-2) | (2,-2) | (3,-2) |
| (-3,-1) | (-2,-1) | (-1,-1) | (0,-1) | (1,-1) | (2,-1) | (3,-1) |
| (-3,0) | (-2,0) | (-1,0) | Vehicle | (1,0) | (2,0) | (3,0) |
| (-3,1) | (-2,1) | (-1,1) | (0,1) | (1,1) | (2,1) | (3,1) |
| (-3,2) | (-2,2) | (-1,2) | (0,2) | (1,2) | (2,2) | (3,2) |
| (-3,3) | (-2,3) | (-1,3) | (0,3) | (1,3) | (2,3) | (3,3) |

FIG.5

| (-3,-3) | (-2,-3) | (-1,-3) | (0,-3) | (1,-3) | (2,-3) | (3,-3) |
|---|---|---|---|---|---|---|
| (-3,-2) | (-2,-2) | (-1,-2) | (0,-2) | (1,-2) | (2,-2) | (3,-2) |
| (-3,-1) | (-2,-1) | (-1,-1) | (0,-1) | (1,-1) | (2,-1) | (3,-1) |
| (-3,0) | (-2,0) | (-1,0) | Vehicle | (1,0) | (2,0) | (3,0) |
| (-3,1) | (-2,1) | (-1,1) | (0,1) | (1,1) | (2,1) | (3,1) |
| (-3,2) | (-2,2) | (-1,2) | (0,2) | (1,2) | (2,2) | (3,2) |
| (-3,3) | (-2,3) | (-1,3) | (0,3) | (1,3) | (2,3) | (3,3) |

FIG.6

| (-3,-3) | (-2,-3) | (-1,-3) | (0,-3) | (1,-3) | (2,-3) | (3,-3) |
|---------|---------|---------|--------|--------|--------|--------|
| (-3,-2) | (-2,-2) | (-1,-2) | (0,-2) | (1,-2) | (2,-2) | (3,-2) |
| (-3,-1) | (-2,-1) | (-1,-1) | (0,-1) | (1,-1) | (2,-1) | (3,-1) |
| (-3,0)  | (-2,0)  | (-1,0)  | Vehicle | (1,0) | (2,0)  | (3,0)  |
| (-3,1)  | (-2,1)  | (-1,1)  | (0,1)  | (1,1)  | (2,1)  | (3,1)  |
| (-3,2)  | (-2,2)  | (-1,2)  | (0,2)  | (1,2)  | (2,2)  | (3,2)  |
| (-3,3)  | (-2,3)  | (-1,3)  | (0,3)  | (1,3)  | (2,3)  | (3,3)  |

FIG.7

| (-3,-3) | (-2,-3) | (-1,-3) | (0,-3) | (1,-3) | (2,-3) | (3,-3) |
|---------|---------|---------|--------|--------|--------|--------|
| (-3,-2) | (-2,-2) | (-1,-2) | (0,-2) | (1,-2) | (2,-2) | (3,-2) |
| (-3,-1) | (-2,-1) | (-1,-1) | (0,-1) | (1,-1) | (2,-1) | (3,-1) |
| (-3,0)  | (-2,0)  | (-1,0)  | Vehicle | (1,0) | (2,0)  | (3,0)  |
| (-3,1)  | (-2,1)  | (-1,1)  | (0,1)  | (1,1)  | (2,1)  | (3,1)  |
| (-3,2)  | (-2,2)  | (-1,2)  | (0,2)  | (1,2)  | (2,2)  | (3,2)  |
| (-3,3)  | (-2,3)  | (-1,3)  | (0,3)  | (1,3)  | (2,3)  | (3,3)  |

FIG.8

|    (-3,-3)   |    (-2,-3)   |    (-1,-3)   |    (0,-3)    |    (1,-3)    |    (2,-3)    |    (3,-3)    |
|    (-3,-2)   |    (-2,-2)   |    (-1,-2)   |    (0,-2)    |    (1,-2)    |    (2,-2)    |    (3,-2)    |
|    (-3,-1)   |    (-2,-1)   |    (-1,-1)   |    (0,-1)    |    (1,-1)    |    (2,-1)    |    (3,-1)    |
|    (-3,0)    |    (-2,0)    |    (-1,0)    |   Vehicle    |    (1,0)     |    (2,0)     |    (3,0)     |
|    (-3,1)    |    (-2,1)    |    (-1,1)    |    (0,1)     |    (1,1)     |    (2,1)     |    (3,1)     |
|    (-3,2)    |    (-2,2)    |    (-1,2)    |    (0,2)     |    (1,2)     |    (2,2)     |    (3,2)     |
|    (-3,3)    |    (-2,3)    |    (-1,3)    |    (0,3)     |    (1,3)     |    (2,3)     |    (3,3)     |

| Collision Possibility | HMI | | | | |
|---|---|---|---|---|---|
| | Sound | | Icon | | |
| | Volume | Interval | Color | Size | Interval |
| 0 | None | None | None | None | None |
| 1 | Volume 1 | Pi-pi- | Yellow | Small | Blink at 1 Hz |
| 2 | Volume 2 | Pipi | Red | Large | Blink at 10 Hz |
| ⋮ | ⋮ | ⋮ | ⋮ | ⋮ | ⋮ |

FIG.14A

| (-3,-3) | (-2,-3) | (-1,-3) | (0,-3) | (1,-3) | (2,-3) | (3,-3) |
|---|---|---|---|---|---|---|
| (-3,-2) | (-2,-2) | (-1,-2) | (0,-2) | (1,-2) | (2,-2) | (3,-2) |
| (-3,-1) | (-2,-1) | (-1,-1) | (0,-1) | (1,-1) | (2,-1) | (3,-1) |
| (-3,0) | (-2,0) | (-1,0) | Sur-Rounding Vehicle A | (1,0) | Vehicle | (3,0) |
| (-3,1) | (-2,1) | (-1,1) | (0,1) | (1,1) | (2,1) | (3,1) |
| (-3,2) | (-2,2) | (-1,2) | (0,2) | (1,2) | (2,2) | (3,2) |
| (-3,3) | (-2,3) | (-1,3) | (0,3) | (1,3) | (2,3) | (3,3) |

FIG. 14B

| (-3,-3) | (-2,-3) | (-1,-3) | (0,-3) | (1,-3) | (2,-3) | (3,-3) |
|---|---|---|---|---|---|---|
| (-3,-2) | (-2,-2) | (-1,-2) | (0,-2) | (1,-2) | (2,-2) | (3,-2) |
| (-3,-1) | (-2,-1) | (-1,-1) | (0,-1) | (1,-1) | (2,-1) | (3,-1) |
| (-3,0) | Sur-Rounding Vehicle A | (-1,0) | Vehicle | (1,0) | (2,0) | (3,0) |
| (-3,1) | (-2,1) | (-1,1) | (0,1) | (1,1) | (2,1) | (3,1) |
| (-3,2) | (-2,2) | (-1,2) | (0,2) | (1,2) | (2,2) | (3,2) |
| (-3,3) | (-2,3) | (-1,3) | (0,3) | (1,3) | (2,3) | (3,3) |

SURROUNDING AREA MONITORING SYSTEM

CROSS REFERENCE TO RELATED APPLICATIONS

This application is a continuation of U.S. patent application Ser. No. 15/110,304, filed on Jul. 7, 2016, in the U.S. Patent and Trademark Office, which is a National Stage of International Application No. PCT/JP2014/061996, filed on Apr. 30, 2014, the contents of which are incorporated herein by reference in their entireties.

TECHNICAL FIELD

The present invention relates to a surrounding area monitoring apparatus, a surrounding area monitoring system and a surrounding area monitoring method, which monitor a surrounding area of a vehicle such as a car, and give information about it to its driver.

BACKGROUND ART

As a technique of detecting conditions around a self vehicle and giving information to a user in the vehicle like a car, a Patent Document 1, for example, proposes an apparatus that detects the vehicle model of a surrounding vehicle with a radar or camera, supposes an area outside the visual field of the vehicle model from the information about the vehicle model, and informs, when the self vehicle is outside the visual field of the surrounding vehicle, the driver of that.

PRIOR ART DOCUMENT

Patent Document

Patent Document 1: Japanese Patent Laid-Open No. 2009-187424.
Patent Document 2: Japanese Patent Laid-Open No. 224637/1990.

DISCLOSURE OF THE INVENTION

Problems to be Solved by the Invention

However, since the conventional apparatus as shown in the Patent Document 1, for example, fixes the blind spot according to a vehicle model regardless of whether the driver actually checks the direction or not, even when the self vehicle decides that it is within the visual field of the surrounding vehicle, there are some cases where the driver of the surrounding vehicle does not look into the direction where the self vehicle is present. In such a case, a problem arises of being unable to give a warning to the driver of the self vehicle even though the self vehicle is traveling outside the visual field of the surrounding vehicle.

On the contrary, even when the self vehicle decides that it is outside the visual field of the surrounding vehicle, if the driver of the surrounding vehicle looks into the direction in which the self vehicle is present in a side mirror or the like, it offers a problem in that even though the self vehicle is traveling within the visual field of the surrounding vehicle, it gives a warning to the driver.

The present invention is implemented to solve the foregoing problems. Therefore it is an object of the present invention to provide a surrounding area monitoring apparatus, surrounding area monitoring system and surrounding area monitoring method, which monitor the surroundings of a vehicle like a car, and give information to its driver only when the vehicle is really outside the visual field of the driver of the surrounding vehicle.

Means for Solving the Problems

To accomplish the object, according to the present invention, a surrounding area monitoring apparatus is provided which is mounted in a self vehicle to which a notification device that gives information to a driver of the self vehicle is connected, the surrounding area monitoring apparatus comprising: a vehicle position acquirer to acquire positional information of the self vehicle; a line-of-sight acquirer to acquire line-of-sight information about the driver of the self vehicle; a visual field calculator to calculate a dynamic visual field range of the driver of the self vehicle in accordance with the line-of-sight information acquired by the line-of-sight acquirer; a communicator to transmit the positional information of the self vehicle acquired by the vehicle position acquirer and the dynamic visual field range of the driver of the self vehicle calculated by the visual field calculator to another vehicle around the self vehicle, and to receive the positional information of said another vehicle and a dynamic visual field range of a driver of said another vehicle; a decider to decide whether the self vehicle is outside the dynamic visual field range of the driver of said another vehicle or not from the positional information of the self vehicle acquired by the vehicle position acquirer and from the positional information of said another vehicle and the dynamic visual field range of the driver of said another vehicle, which are received from the communicator; and a notification controller to instruct the notification device to output notification information when the decider decides that the self vehicle is outside the dynamic visual field range of the driver of said another vehicle.

Advantages of the Invention

According to the surrounding area monitoring apparatus in accordance with the present invention, it is configured in such a manner that it receives the visual field information of the driver of the surrounding vehicle of the self vehicle, and decides whether the self vehicle is outside the visual field of the surrounding vehicle or not in accordance with the visual field information. Thus, it can recognize the current dynamic visual field range of the driver of the surrounding vehicle actually traveling around the self vehicle, and obtain the more accurate visual field range. Accordingly, it can notify the driver of the really necessary information appropriately and can reduce giving unnecessary information.

BRIEF DESCRIPTION OF THE DRAWINGS

FIG. 1 is a block diagram showing a surrounding area monitoring apparatus of an embodiment 1 and an example of peripheral devices connected thereto;

FIG. 2 is a table showing an example of a visual field table that relates a vehicle model with a line-of-sight direction;

FIG. 3 is a flowchart showing the operation of the visual field computing unit of the surrounding area monitoring apparatus of the embodiment 1;

FIG. 4 is a diagram showing a range of a visual field α1 retained in the visual field computing unit;

FIG. 5 is a diagram showing a range of a visual field β1 retained in the visual field computing unit;

FIG. 6 is a diagram showing a range of a visual field γ1 retained in the visual field computing unit;

FIG. 7 is a diagram showing a range of a visual field δ1 retained in the visual field computing unit;

FIG. 8 is a diagram showing a range of the current dynamic visual field (composite visual field) of the driver calculated and combined by the visual field computing unit in the embodiment 1;

FIGS. 14A and 14B are diagrams showing visual field information about a surrounding vehicle A calculated by the deciding unit in the embodiment 2 and a positional relationship between the surrounding vehicle A and the self vehicle;

FIGS. 15A and 15B are diagrams showing visual field information about a surrounding vehicle B calculated by the deciding unit in the embodiment 2 and a positional relationship between the surrounding vehicle B and the self vehicle;

FIG. 16 is a diagram showing, centering on the self vehicle, visual field information about the surrounding vehicles A and B combined by the deciding unit in the embodiment 2;

BEST MODE FOR CARRYING OUT THE INVENTION

Figure 9:
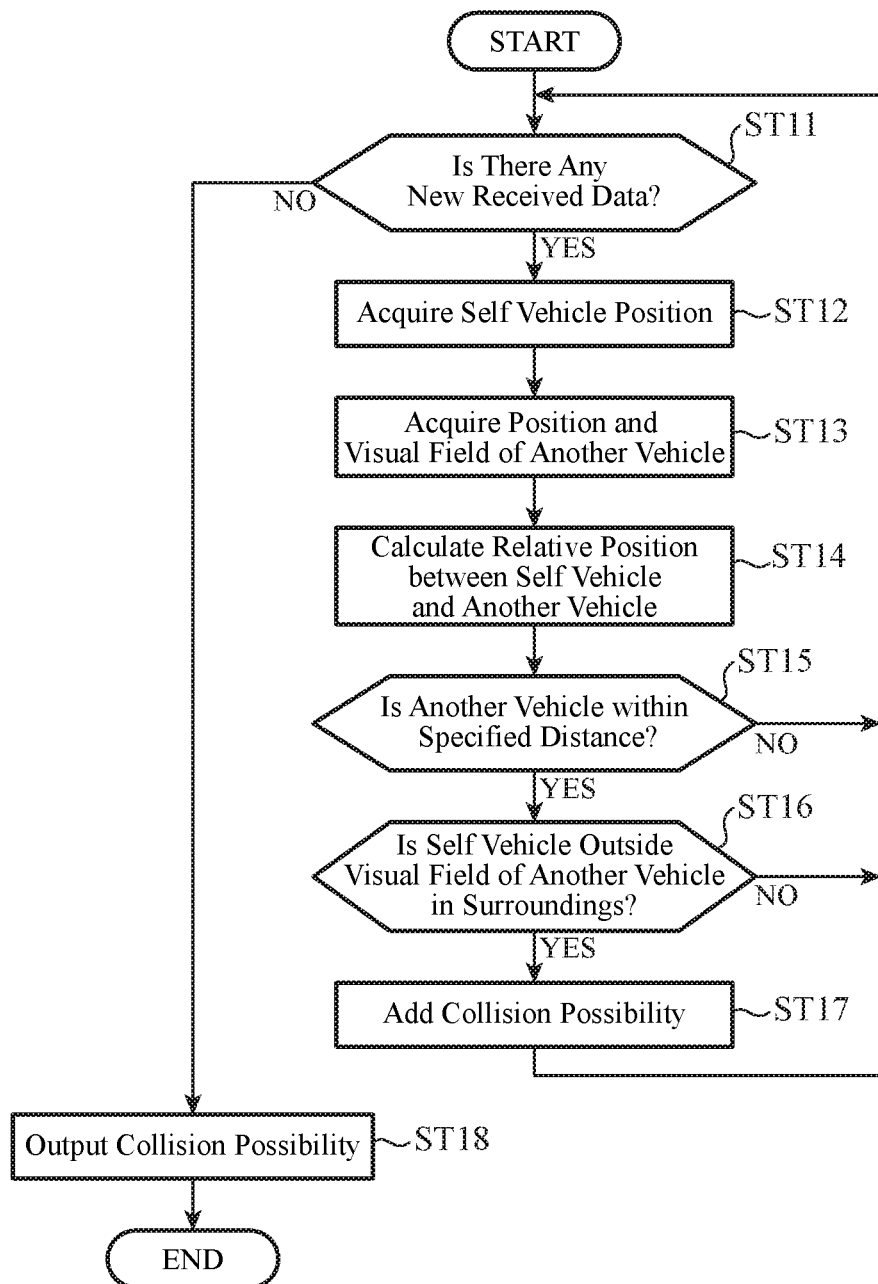
FIG. 9 is a flowchart showing the operation of the deciding unit in the surrounding area monitoring apparatus of the embodiment 1.

The best mode for carrying out the invention will now be described with reference to the accompanying drawings.

A surrounding area monitoring apparatus in accordance with the present invention is one that receives visual field information about a driver of a surrounding vehicle of a self vehicle, decides whether the self vehicle is outside the visual field of the surrounding vehicle or not in accordance with the information, and gives notification information such as an alarm and guidance. Incidentally, in the following embodiments, a surrounding area monitoring apparatus in accordance with the present invention can be built into an onboard device mounted in a vehicle like a car, such as onboard equipment like a car navigation system and dashboard, or can be applied to a server. In addition, it is applicable to an application installed into a mobile data terminal such as a smartphone, tablet PC and cellular phone.

Embodiment 1

FIG. 1 is a block diagram showing a surrounding area monitoring apparatus of an embodiment 1 and an example of peripheral devices connected thereto. The surrounding area monitoring apparatus 1 mounted in a vehicle such as a car comprises a line-of-sight acquiring unit 101, a vehicle model information acquiring unit 102, a visual field computing unit 103, a vehicle position acquiring unit 104, a communication unit 105, a deciding unit 107 and a notification controller 108.

In addition, an in-vehicle camera 2, a GPS (Global Positioning System) 3, an intervehicle communication antenna 4 and an HMI (Human Machine Interface) 5 are connected as peripheral devices of the surrounding area monitoring apparatus 1. Incidentally, it is supposed here that all the vehicles have the surrounding area monitoring apparatus 1 and the peripheral devices connected thereto, which are mounted on the vehicle.

The line-of-sight acquiring unit 101 receives an image the in-vehicle camera 2 outputs, and acquires from the image the line-of-sight information about the driver of the self vehicle (direction of the line-of-sight and positional information of the driver's eyes). Incidentally, the in-vehicle camera 2 is installed in such a manner as to look in the interior of the vehicle so as to take its driver's face. In addition, as for a detection method of the line-of-sight, since a well-known technique such as described in the Patent Document 2 can be used, the description thereof is omitted here.

The vehicle model information acquiring unit 102 acquires information about the vehicle model of the self vehicle (vehicle model information) from the outside of the surrounding area monitoring apparatus 1 using a communication interface such as CAN (Controller Area Network).

The visual field computing unit 103 calculates a dynamic visual field range of the driver of the self vehicle from the vehicle model information about the self vehicle acquired by the vehicle model information acquiring unit 102, and from the line-of-sight information (line-of-sight direction and positional information of the eyes) of the driver of the self vehicle acquired by the line-of-sight acquiring unit 101. The visual field can be calculated by referring to a visual field table as shown in FIG. 2, for example, which relates a vehicle model with line-of-sight directions.

FIG. 2 is a diagram showing an example of a visual field table which relates a vehicle model with line-of-sight directions. The visual field computing unit 103 retains the visual field table as shown in FIG. 2, which stores various data resulting from relating the manufacturer and vehicle model of a vehicle with visual fields when the line-of-sight direction is toward a rearview mirror, with a visual field when it is directed toward the left side mirror, with a visual field when it is directed in a forward direction, with a visual field when it is directed toward the left, with a visual field when it is directed toward the right side mirror (not shown in the table of FIG. 2), with a visual field when it is directed toward the right (also not shown in the table of FIG. 2) and so on.

Then, the visual field computing unit 103 calculates the dynamic composite visual field range of the driver by combining the visual field it calculates and the visual field within a past specified time (T1) which is determined in advance. Details of the processing by the visual field computing unit 103 will be described later with reference to the flowchart shown in FIG. 3.

The vehicle position acquiring unit 104 acquires positional (latitude and longitude) information of the self vehicle in accordance with the information of the GPS 3.

The communication unit 105 transmits the positional information of the self vehicle acquired by the vehicle position acquiring unit 104 together with the dynamic composite visual field range of the driver of the self vehicle calculated by the visual field computing unit 103 to another vehicle around the self vehicle via the intervehicle communication antenna 4, and receives via the intervehicle communication antenna 4 the positional information (latitude and longitude) of another vehicle and a dynamic visual field range of a driver of another vehicle, which are transmitted by the another vehicle around the self vehicle.

The deciding unit 107 decides whether the self vehicle is outside the dynamic visual field range of the driver of a surrounding vehicle (another vehicle) or not according to the positional information (latitude and longitude) acquired by the vehicle position acquiring unit 104, the positional information (latitude and longitude) of the surrounding vehicle (another vehicle) received by the communication unit 105, and the dynamic visual field range of the driver of the surrounding vehicle (another vehicle).

Then, when the deciding unit 107 decides that the self vehicle is outside the dynamic visual field range of the driver of the surrounding vehicle (another vehicle), it outputs the collision possibility between the self vehicle and the another vehicle, which is a result of the decision of the deciding unit 107, to the notification controller 108. Details of the processing by the deciding unit 107 will be described later with reference to the flowchart of FIG. 9.

When the notification controller 108 receives the output of the deciding unit 107, that is, when the deciding unit 107 decides that the self vehicle is outside the dynamic visual field range of the driver of the surrounding vehicle (another vehicle), the notification controller 108 instructs the HMI 5 to output notification information such as an alarm. Here the HMI 5 is a notification device that gives information to the driver of the self vehicle, such as a voice output device like a speaker and a display device like a display and an icon.

At this time, the notification controller 108 instructs the HMI 5, the notification device, to output the notification information after an elapse of a predetermined specified time (T2) after the deciding unit 107 decides that the self vehicle is outside the dynamic visual field range of the driver of the surrounding vehicle (another vehicle).

A concrete notification method for giving information to the driver of the self vehicle will be described with reference to the table shown in FIG. 11.

Next, referring to the flowchart shown in FIG. 3, the operation of the visual field computing unit 103 in the surrounding area monitoring apparatus of the embodiment 1 will be described.

First, the visual field computing unit 103 acquires the driver's line-of-sight and driver's eye position from the line-of-sight acquiring unit 101 (step ST1). Next, it acquires the vehicle model information about the self vehicle from the vehicle model information acquiring unit 102 (step ST2).

Then, the visual field computing unit 103 calculates the visual field of the driver by referring to the visual field table which relates the vehicle model with the line-of-sight directions as shown in FIG. 2, for example (step ST3).

For example, if the vehicle model information about the self vehicle acquired at step ST2 is vehicle model A1 of a manufacturer A and if the line-of-sight direction acquired at step ST1 is the rearview mirror, the visual field computing unit 103 can calculate that the current visual field is "a1" by referring to the visual field table shown in FIG. 2.

Incidentally, the visual field computing unit 103 also stores in advance ranges the visual fields α1-α6, β1-β6, γ1-γ6 and δ1-δ6 shown in FIG. 2 designate. FIG. 4-FIG. 7 are diagrams showing the ranges of the visual fields α1, β1, γ1, and δ1 retained in the visual field computing unit 103, respectively.

More specifically, the visual field "a1" calculated at step ST3 consists of ranges (0,1) (−1,2) (0,2) (1,2) (−2,3) (−1,3) (0,3) (1,3) (2,3) as shown in FIG. 4. Incidentally, X of (X,Y) shown here is plus on the right side with respect to the forward direction of the vehicle (seen from the driver) and is minus on the left side, and Y is plus toward the rear of the vehicle and is minus toward the front of it.

Thus, the visual field computing unit 103 records the visual field it calculates (step ST4). Then, if there is any visual field recorded within the preceding predetermined specified time (T1) (within the past specified time (T1)) (YES at step ST5), the visual field computing unit 103 acquires visual fields of past several times recorded within the past specified time (T1) (step ST6), combines them with the visual field it calculates at step ST3 (step ST7), and outputs to the communication unit 105 (step ST8).

On the other hand, if there is not any visual field recorded within the past specified time (T1) (NO at step ST5), the visual field computing unit 103 outputs the visual field it calculates at step ST3 to the communication unit 105 without adding any change (step ST8).

It is assumed here that the driver of the vehicle has already looked at the left side mirror, at the front and left side within the past specified time (T1) in addition to the rearview mirror at the present. At this time, the visual field computing unit 103 calculates and records the visual field each time at steps ST1-ST4 of the flowchart shown in FIG. 3.

More specifically, it records the range (−1,0) (−1,1) (−2,2) (−1,2) (−3,3) (−2,3) (−1,3) as the visual field β1 corresponding to the left side mirror in the vehicle model A1 as shown in FIG. 5, records the range (−2,−3) (−1,−3) (0,−3) (1,−3) (2,−3) (−1,−2) (0,−2) (1,−2) (0,−1) as the visual field γ1 corresponding to the front as shown in FIG. 6, and records the range (−3,−2) (−3,−1) (−2,−1) (−1,0) (−2,1) (−3,2) as the visual field δ1 corresponding to the left side as shown in FIG. 7.

Incidentally, as is seen from FIG. 7, as for the visual field δ1 when the line-of-sight direction is the left side, the visual field does not contain (−3,0) (−2,0) (−3,1). This is because these parts are not visible because they are concealed by a pillar of the self vehicle as to the vehicle model A1.

Then, since the decision result whether there is any visual field recorded within the past specified time (T1) or not is YES at step ST5, the visual field computing unit 103 acquires the visual fields of the past several times recorded within the past specified time (T1), that is, the three visual fields shown in FIG. 5-FIG. 7 (step ST6), and combines them with the current visual field shown in FIG. 4 (step ST7) to obtain the composite visual field range as shown in FIG. 8.

FIG. 8 is a diagram showing the current dynamic visual field of the driver (composite visual field) calculated and combined by the visual field computing unit 103. As shown in FIG. 8, the composite visual field of the visual fields recorded within the past specified time (T1) consists of (−2,−3) (−1,−3) (0,−3) (1,−3) (2,−3) (−3,−2) (−1,−2) (0,−2) (1,−2) (−3,−1) (−2,−1) (0,−1) (−1,0) (−2,1) (−1,1) (0,1) (1,1)

(−3,2) (−2,2) (−1,2) (0,2) (1,2) (−3,3) (−2,3) (−1,3) (0,3) (1,3) (2,3), which is output to the communication unit (step ST8).

In this way, when the visual field computing unit 103 calculates the visual field range, it can obtain the more accurate visual field range by using the vehicle model information and the positional information of the driver's eyes because this enables the visual field computing unit 103 to consider differences in the visual field ranges concealed by a pillar depending on the differences in the vehicle models, and differences in the position of the driver's eyes among individuals.

Next, referring to the flowchart shown in FIG. 9, the operation of the deciding unit 107 in the surrounding area monitoring apparatus of the embodiment 1 will be described.

First, the deciding unit 107 checks whether or not it is able to receive the information about another vehicle from the communication unit 105 via the intervehicle communication. Then, if it is able to receive the information about new another vehicle, that is, if there is any new received data (step ST11), the deciding unit 107 acquires the position of the self vehicle from the vehicle position acquiring unit 104 (step ST12).

In addition, the deciding unit 107 acquires from the information about the new another vehicle it receives the position of the another vehicle and the visual field information about its driver (step ST13). Then, according to the positional information of the self vehicle acquired at step ST12 and the positional information of the another vehicle acquired at step ST13, the deciding unit 107 calculates the relative position between the self vehicle and the another vehicle (step ST14).

The deciding unit 107 checks from the relative position it calculates whether the distance from the another vehicle to the self vehicle is within a predetermined specified range (distance) or not, that is, whether the another vehicle is at a position within the specified range (distance) from the self vehicle or not (step ST15). At this time, it is assumed that the predetermined specified range (distance) is set in such a manner that it varies in accordance with the speed of the self vehicle.

Then, if the deciding unit 107 decides that the position of the another vehicle is outside the specified range (outside the distance) (NO at step ST15), it decides that the another vehicle is so far that it does not exert any influence on a collision, and returns to step ST11 to repeat the processing.

On the other hand, if the position of the another vehicle is within the specified range (within the distance) (YES at step ST15), the deciding unit 107 decides that the another vehicle is not far, that is, is another vehicle around the self vehicle (surrounding vehicle), superimposes the visual field information about the another vehicle acquired at step ST13 on the relative position calculated at step ST14, and decides whether the self vehicle is outside the visual field about the another vehicle (surrounding vehicle) or not (step ST16).

Then, if the deciding unit 107 decides that the self vehicle is outside the visual field of the surrounding vehicle (YES at step ST16), it increases the collision possibility to be informed to the notification controller 108 (step ST17). Incidentally, as for the collision possibility, it can be increased one by one, or a value to be added thereto can be varied in accordance with the relative distance.

On the other hand, unless the self vehicle is outside the visual field of the surrounding vehicle, that is, if it is within the visual field of the surrounding vehicle (NO at step ST16), since the driver of the surrounding vehicle watches the self vehicle without being notified, the deciding unit 107 returns to step ST11 to repeat the processing.

For example, when there are two vehicles around the self vehicle (within the specified distance from the self vehicle), and if the self vehicle is outside the visual fields of the two vehicles, the collision possibility is 2, but if the self vehicle is outside the visual field of one of the two vehicles, the collision possibility is 1.

Then, if the new received data is reduced to zero, that is, if the self vehicle has received all the data of the other vehicles in the range that enables data exchange or there is no more surrounding vehicle (NO at step ST11), the deciding unit 107 outputs the collision possibility to the notification controller 108 (step ST18), resets the collision possibility to 0 (zero), and terminates the processing.

Next, referring to the flowchart shown in FIG. 10, the operation of the notification controller 108 in the surrounding area monitoring apparatus of the embodiment 1 will be described.

First, receiving the collision possibility information from the deciding unit 107 (YES at step ST21), the notification controller 108 checks whether the collision possibility received is not less than a predetermined specified value or not (step ST22). It is assumed here that "1" is set as the specified value.

Then, if the collision possibility is not less than the specified value (YES at step ST22), the notification controller 108 further checks whether or not the self vehicle is outside the visual field of the surrounding vehicle for not less than a predetermined specified time (T2) (step ST23). Although it is assumed here that T2=2 seconds, for example, the value can be set properly by a user.

If the self vehicle is outside the visual field of the surrounding vehicle for not less than the specified time (T2=2 seconds) (YES at step ST23), the notification controller 108 outputs the notification information corresponding to the collision possibility it received from the deciding unit 107 at step ST21 via the HMI 5 (step ST24).

In contrast, if the collision possibility is less than the specified value at step ST22 (NO at step ST22), or if the duration the self vehicle is outside the visual field of the surrounding vehicle is less than the specified time (T2) at step ST23 (NO at step ST23), the notification controller 108 terminates the processing promptly.

Thus, the notification controller 108 instructs to output the notification information only when the specified time (T2) has elapsed after the deciding unit 107 decides that the self vehicle is outside the dynamic visual field range of the driver of the surrounding vehicle, thereby being able to prevent the driver from feeling uncomfortable because of receiving the notification repeatedly in a short time, and to suppress unnecessary notification.

Figures 10, 11:
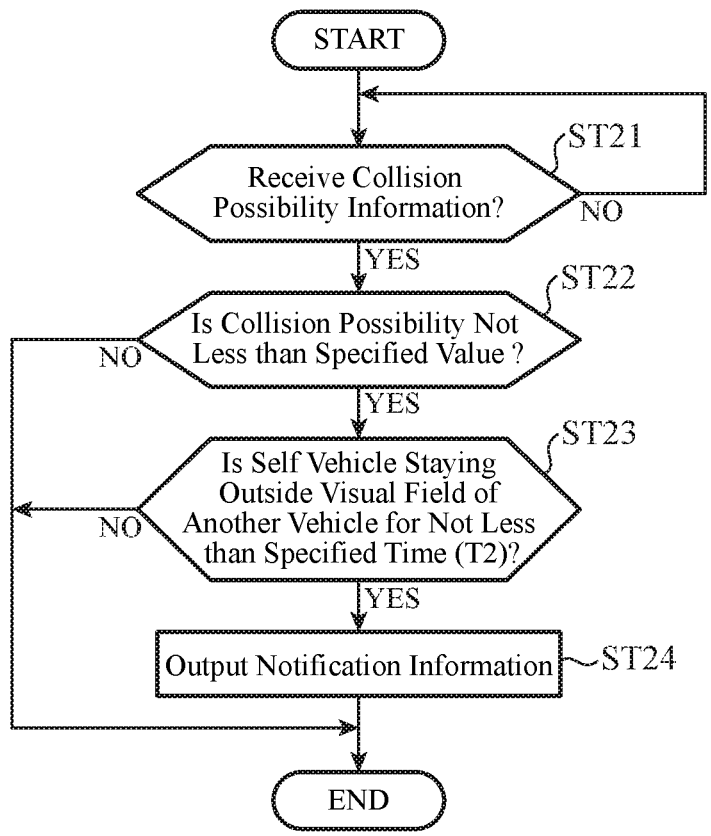
FIG. 10 is a flowchart showing the operation of the notification controller in the surrounding area monitoring apparatus of the embodiment 1.
FIG. 11 is a table showing an example of notification patterns that relate collision possibility with notification methods of notification information through an HMI in the embodiment 1.

FIG. 11 is a table showing an example of a notification pattern that relates the collision possibility and a notification method of the notification information through the HMI.

FIG. 11 shows, as an example of the HMI 5 which is the notification device for giving information to the driver, a case of outputting the notification information by voice from a speaker, and a case of outputting the notification information by an icon display.

For example, a notification method of the notification information is set in such a manner that when the collision possibility is 0 (zero), the HMI 5 does not output voice from the speaker or does not perform the icon display; that when the collision possibility is 1, it causes the speaker to output voice at a volume 1 with long intervals like pi-pi-, or the icon display to show a yellow, small-sized icon at intervals of 1

Hz; and that when the collision possibility is 2, it causes the speaker to output voice at a volume 2 with short intervals like pipi, or the icon display to show a red, large-sized icon at intervals of 10 Hz.

Thus, by altering the intensity of the output of the notification information in accordance with the collision possibility in such a manner as to enhance the output of the notification information when the collision possibility is high and to weaken the output of the notification information when the collision possibility is low, the notification controller 108 enables the driver to easily recognize the level of the collision possibility in accordance with the intensity of the output of the notification information.

In this case, the notification controller 108 instructs the notification device (HMI 5 like the speaker or icon) to alter the intensity of the output of the notification information in accordance with the collision possibility. Thus, when the intensity of the output of the notification information is increased, the notification controller 108 instructs the notification device to increase the volume of the voice, or to emphasize the icon display.

This enables the driver to recognize the level of the collision possibility even when he or she faces forward. In addition, in the case of the display, it offers an advantage of enabling the driver's eyes to fall on it and enabling the driver to become more readily aware of the possibility of a collision.

Incidentally, as for the notification method as to whether the information is to be given by voice using the speaker, or by the icon display, or by both of them, a configuration is possible which enables a user to set it properly. In addition, it goes without saying that a notification method other than the voice or icon display can be used as well.

For example, when the method is set which gives the information by both the voice and icon display, and if the collision possibility it receives from the deciding unit 107 is 2, the notification controller 108 instructs the notification device (HMI 5 like the speaker and icon) to notify the driver by outputting the sound "pipi" at volume 2 and by making the large-size, red icon display blinking at intervals of 10 Hz.

As described above, according to the present embodiment 1, it is configured in such a manner that it receives the visual field information about the driver of the surrounding vehicle of the self vehicle, and decides whether the self vehicle is outside the visual field of the surrounding vehicle or not in accordance with the information. Thus, it enables the driver of the self vehicle to find out the current dynamic visual field range of the driver of the surrounding vehicle actually traveling around the self vehicle, and to obtain a more accurate visual field range. Accordingly, it can provide really necessary information appropriately, and can suppress unnecessary notification information.

Incidentally, as for the surrounding area monitoring apparatus 1, it is applied to a vehicle like a car with equipment mounted therein, and is implemented as a concrete means which cooperates hardware with software through a microcomputer of the equipment, which executes programs of specified processing particular to the present invention. The same holds true for the following embodiments.

Embodiment 2

Figure 12:
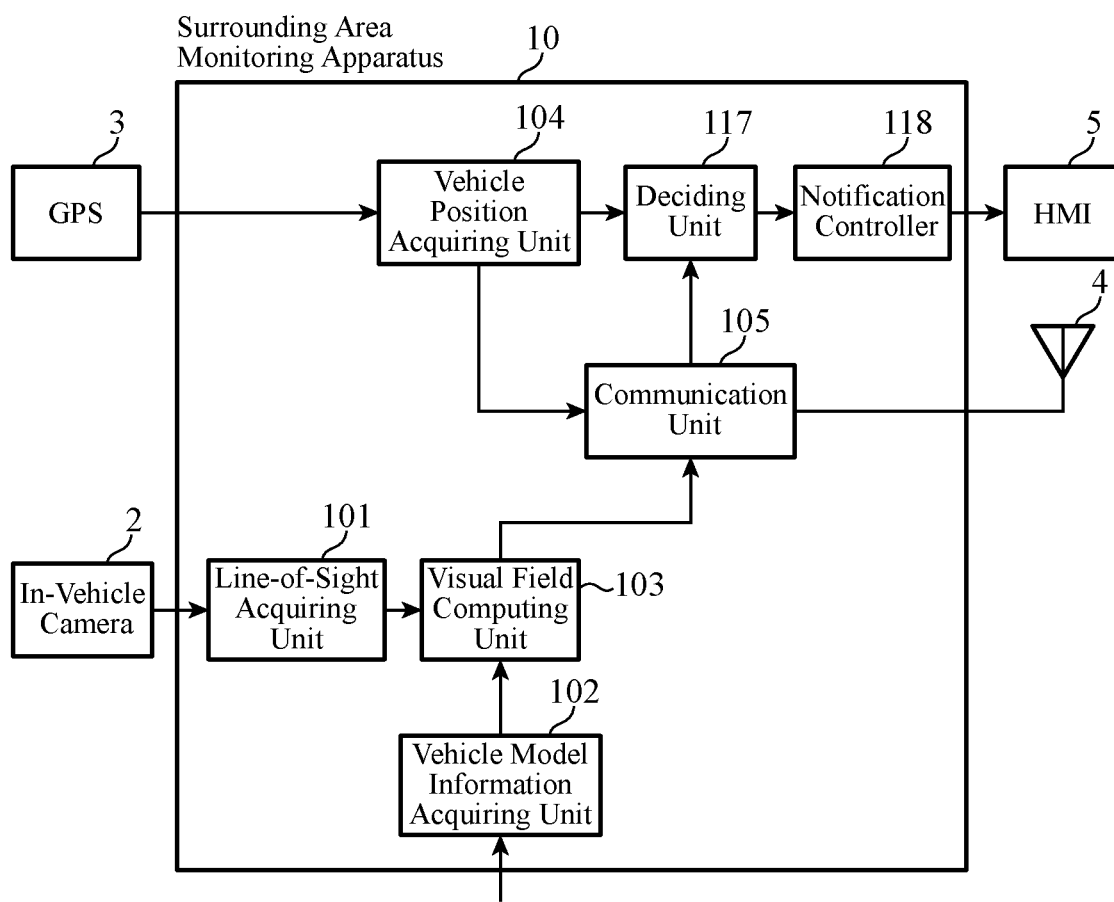
FIG. 12 is a block diagram showing a surrounding area monitoring apparatus of an embodiment 2 and an example of peripheral devices connected thereto.

FIG. 12 is a block diagram showing an example of a surrounding area monitoring apparatus of an embodiment 2 and peripheral devices connected thereto. Incidentally, the same components as those described in the embodiment 1 are designated by the same reference numerals and their redundant description will be omitted. The surrounding area monitoring apparatus 10 of the embodiment 2 described below differs from the surrounding area monitoring apparatus 1 of the embodiment 1 in the processing contents of a deciding unit 117 and a notification controller 118.

Although the surrounding area monitoring apparatus 1 of the embodiment 1 decides whether the self vehicle is outside the visual field range of another vehicle (surrounding vehicle) or not, and gives information only about the collision possibility, the surrounding area monitoring apparatus 10 of the embodiment 2 not only decides whether the self vehicle is outside the visual field range of another vehicle (surrounding vehicle) or not, but also calculates and guides the distance and direction the self vehicle should move to come into the visual field of the surrounding vehicle.

The deciding unit 117 decides whether the self vehicle is outside the dynamic visual field range of a driver of a surrounding vehicle (another vehicle) or not according to the positional information (latitude and longitude) acquired by the vehicle position acquiring unit 104, the positional information (latitude and longitude) of the surrounding vehicle (another vehicle) received by the communication unit 105, and the dynamic visual field range of the driver of the surrounding vehicle (another vehicle), and when it decides that the self vehicle is outside the visual field range, it calculates the distance and direction up to the position where the self vehicle comes into the visual field of the surrounding vehicle, and outputs them to the notification controller 118.

More specifically, the deciding unit 117 in the surrounding area monitoring apparatus 10 of the embodiment 2 differs from the deciding unit 107 of the surrounding area monitoring apparatus 1 of the embodiment 1 in that it combines the positional information and the visual field information of the surrounding vehicle received through the communication unit 105, and decides whether the self vehicle is outside the visual field range of the another vehicle (surrounding vehicle) or not, and that when the self vehicle is outside the visual field range, it calculates the distance and direction up to the position where the self vehicle comes into the visual field of the surrounding vehicle, and outputs them to the notification controller 118.

Details of the processing by the deciding unit 117 will be described later with reference to the flowchart shown in FIG. 13.

In addition, when the notification controller 118 receives the output of the deciding unit 117, that is, when a decision is made by the deciding unit 117 that the self vehicle is outside the dynamic visual field range of the driver of the surrounding vehicle (another vehicle), it instructs the HMI 5, which is a notification device that gives information to the driver of the self vehicle, such as the voice output device like a speaker and a display device like a display and an icon, to output the notification information that guides the self vehicle into the dynamic visual field range of the driver of the surrounding vehicle (another vehicle).

At this time, when the predetermined specified time (T2) has elapsed after the deciding unit 117 decides that the self vehicle is outside the dynamic visual field range of the driver of the surrounding vehicle (another vehicle), the notification controller 118 instructs the HMI 5, the notification device, to output the notification information.

As for a concrete notification method for giving information to the driver of the self vehicle, it will be described later using a display example shown in FIGS. 18A and 18B.

Next, referring to the flowchart shown in FIG. 13, the operation of the deciding unit 117 in the surrounding area monitoring apparatus 10 of the embodiment 2 will be described.

First, the deciding unit 117 checks whether or not it is able to receive the information about another vehicle from the communication unit 105 via the intervehicle communication. Then, if it is able to receive the information about new another vehicle, that is, if there is any new received data (step ST31), the deciding unit 117 acquires the position of the self vehicle from the vehicle position acquiring unit 104 (step ST32).

In addition, the deciding unit 117 acquires from the information about the new another vehicle it receives the position of the another vehicle and the visual field information about its driver (step ST33). Then, according to the positional information of the self vehicle acquired at step ST32 and the positional information of the another vehicle acquired at step ST33, the deciding unit 117 calculates the relative position between the self vehicle and the another vehicle (step ST34).

The deciding unit 117 checks from the relative position it calculates whether the distance from the another vehicle to the self vehicle is within a predetermined specified range (distance) or not, that is, whether the another vehicle is at a position within the specified range (distance) from the self vehicle or not (step ST35). At this time, it is assumed that the predetermined specified range (distance) is set in such a manner that it varies in accordance with the speed of the self vehicle.

Then, if the deciding unit 117 decides that the position of the another vehicle is outside the specified range (outside the distance) (NO at step ST35), it decides that the another vehicle is so far that it does not exert any influence on a collision, and returns to step ST31 to repeat the processing.

On the other hand, if the position of the another vehicle is within the specified range (within the distance) (YES at step ST35), the deciding unit 117 decides that the another vehicle is not far, that is, is another vehicle around the self vehicle (surrounding vehicle), calculates the visual field about the another vehicle (surrounding vehicle) around the self vehicle by offsetting the relative position it calculates at step ST34 (step ST36), and returns to step ST31 to repeat the processing.

For example, assume that the deciding unit 117 receives the visual field information as shown in FIG. 14A from the another vehicle (surrounding vehicle) A at step ST33. In this case, according to the positional information of the self vehicle acquired at step ST32 and the positional information of the another vehicle (surrounding vehicle) A acquired at step ST33, the deciding unit 117 calculates that the relative position of the self vehicle with respect to the another vehicle (surrounding vehicle) A is the position at +2 in the X direction from the another vehicle (surrounding vehicle) A (step ST34).

As a result, the deciding unit 117 decides that the self vehicle and the another vehicle (surrounding vehicle) A are within the specified distance (step ST35), and calculates the visual field information with the self vehicle being placed at the center as shown in FIG. 14B by applying an offset corresponding to the relative position to FIG. 14A (step ST36).

Figures 15A, 15B:
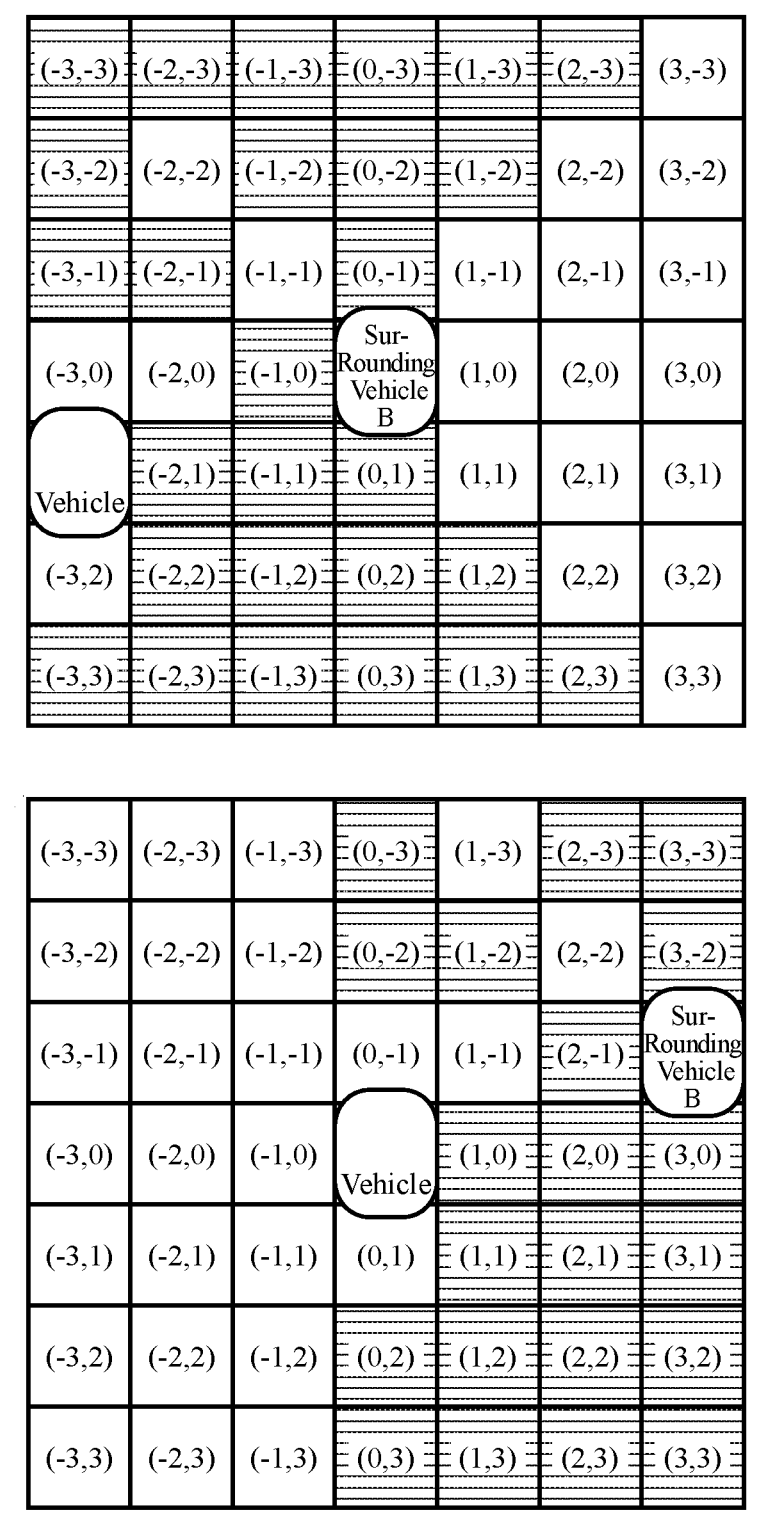

In addition, assume that the deciding unit 117 receives the visual field information as shown in FIG. 15A from another vehicle (surrounding vehicle) B. In this case, it executes similar processing to calculate the visual field information with the self vehicle being placed at the center as shown in FIG. 15B by applying an offset corresponding to the relative position.

Figure 16:
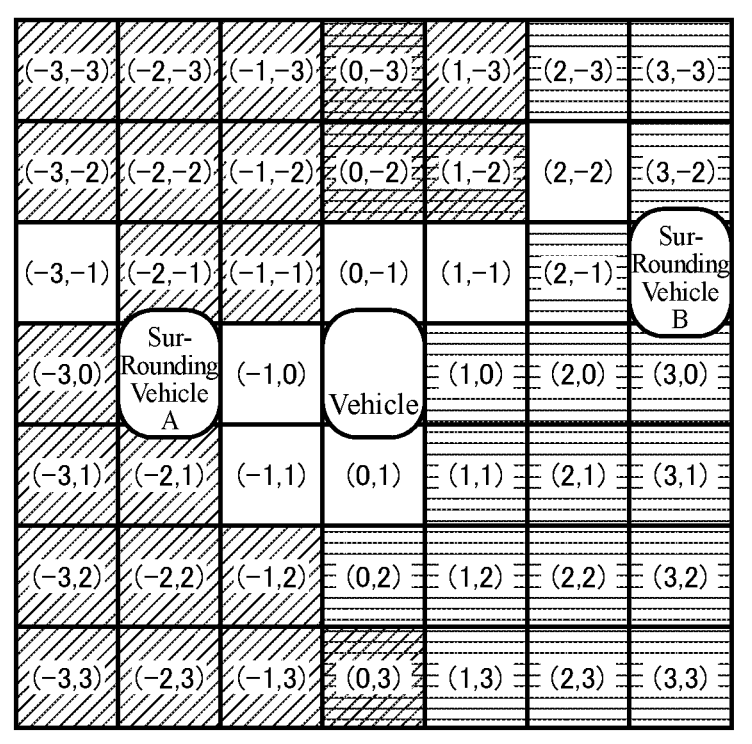

In this way, when new received data occurs (YES at step ST31), as a result repeating the processing from step ST31 to ST36 of combining the dynamic visual field ranges of the drivers of other vehicles according to the dynamic visual field ranges of the plurality of the other vehicles, the deciding unit 117 can obtain the composite visual field information as shown in FIG. 16 that combines the dynamic visual field ranges of the drivers of the plurality of vehicles with the self vehicle being placed at the center.

Then, if the new received data is reduced to zero, that is, if the self vehicle has received all the data of the other vehicles in the range that enables data exchange or there is no more surrounding vehicle (NO at step ST31), the deciding unit 117 checks whether the self vehicle is outside the visual field of the surrounding vehicle or not according to the composite visual field information obtained previously (step ST37).

If the deciding unit 117 decides that the self vehicle is outside the visual field of the surrounding vehicles (YES at step ST37), it calculates the distance and direction up to the position where the self vehicle comes into the visual field of the surrounding vehicles (step ST38), and outputs the distance and direction to the notification controller 118 (step ST39).

On the other hand, if the deciding unit 117 does not decide that the self vehicle is outside the visual field of the surrounding vehicles (NO at step ST37), since the self vehicle is within the visual field of the surrounding vehicles, the deciding unit 117 sets the distance to the position that comes into the visual field at 0 (zero), and outputs the distance and direction (step ST39).

Thus, the deciding unit 117 combines the dynamic visual field ranges of the drivers of the plurality of vehicles, thereby being able to provide a more accurate dynamic visual field range. In addition, even when a plurality of vehicles are present around the self vehicle, it can decide whether the self vehicle is placed in a blind spot of each of the plurality of vehicles or not.

Figure 17:
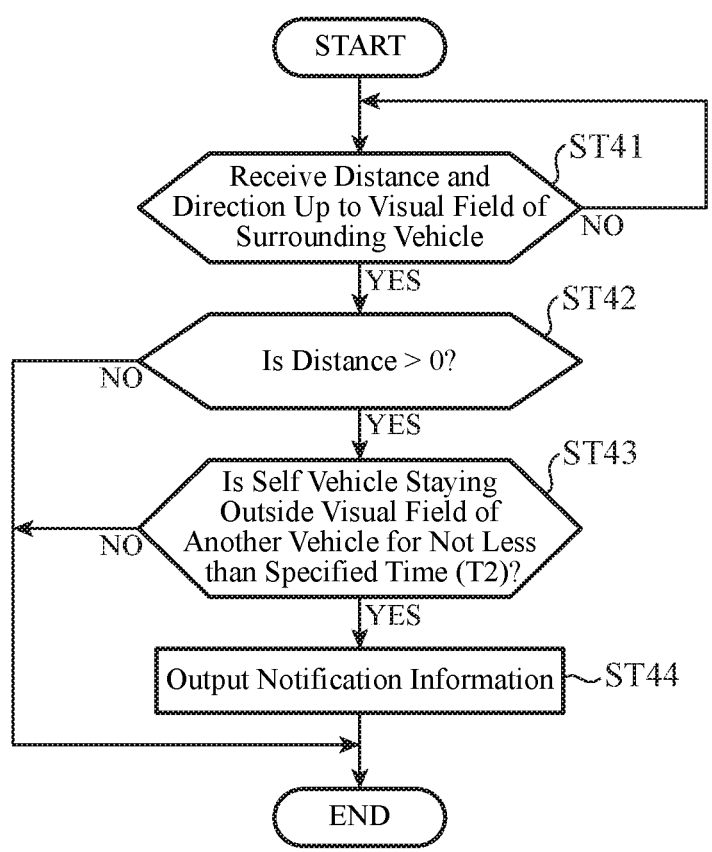
FIG. 17 is a flowchart showing the operation of the notification controller in the surrounding area monitoring apparatus of the embodiment 2.

Next, referring to the flowchart shown in FIG. 17, the operation of the notification controller 118 in the surrounding area monitoring apparatus 10 of the embodiment 2 will be described.

First, when the notification controller 118 receives the distance and direction from the self vehicle to the visual field of the surrounding vehicles, which are the output information of the deciding unit 117 (YES at step ST41), it checks whether the received distance is greater than 0 (zero) or not, that is, whether the self vehicle is outside the visual field of the surrounding vehicle or not (step ST42).

Then, if the self vehicle is outside the visual field of the surrounding vehicles (YES at step ST42), the notification controller 118 checks whether the self vehicle is outside the visual field of the surrounding vehicles for not less than the predetermined specified time (T2) or not (step ST43). Although it is assumed here that T2=2 seconds, for example, the value can be set properly by a user.

If the self vehicle is outside the visual field of the surrounding vehicles for not less than the specified time (T2=2 seconds) (YES at step ST43), the notification controller 118 outputs via the HMI 5 the guidance on the distance and direction indicating the position to which the self vehicle has to move to come into the visual field of the surrounding vehicles (step ST44).

In contrast, if the distance is 0 (zero) at step ST42, that is, if the self vehicle is within the visual field of the surrounding vehicles (NO at step ST42), or if the duration in which the self vehicle stays outside the visual field of the surrounding vehicles is less than the specified time (T2) at step ST43 (NO at step ST43), the notification controller 118 terminates the processing immediately.

Thus, the notification controller 118 instructs to output the notification information only when the specified time (T2) has elapsed after the deciding unit 117 decides that the self vehicle is outside the dynamic visual field range of the driver of a surrounding vehicle, thereby being able to prevent the driver from feeling uncomfortable because of receiving the notification repeatedly in a short time, and to suppress unnecessary notification.

Figure 18A:
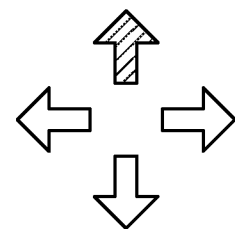
FIGS. 18A and 18B are diagrams showing a display example of a notification pattern in the embodiment 2.
Figure 18B:
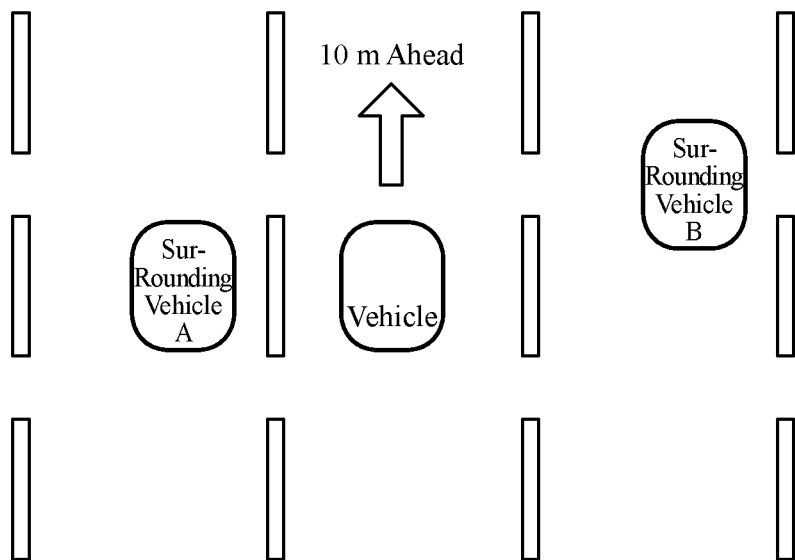

FIGS. 18A and 18B are a diagram showing a display example of a notification pattern in the present embodiment 2.

In this example, as shown in FIG. 16, the self vehicle is outside the visual field of both the surrounding vehicles A and B (YES at step ST37), and positions (0,−3) (0,−2) (1,−2) and (0,3) are within the visual field range of both the surrounding vehicles A and B.

Among them, since the position closest to the self vehicle is (0,−2), the distance and direction that will bring the self vehicle into the visual field of the surrounding vehicles A and B are calculated as −2 in the Y direction, that is, the position shifted by 2 forward (step ST38). Incidentally, it is assumed here that one division in the Y direction is about 5 meters.

Thus, the notification controller 118 can instruct the notification device to guide the driver by blinking only a forward arrow of the icon display in red as shown in FIG. 18A, for example, or by indicating as shown in FIG. 18B the relative positional relationships between the self vehicle and the surrounding vehicles A and B and by displaying a forward arrow and a message "10 m ahead" as to the self vehicle.

Thus, the present embodiment 2 not only notifies that the self vehicle is outside the visual field of the surrounding vehicles, but also gives information to lead the self vehicle into the dynamic visual field range. Accordingly, it can support the driver to drive more safely.

In addition, when outputting the notification information for guiding by the icon display as shown in FIG. 18A, the driver can visually learn the route more intuitively. Incidentally, in this case, a configuration is also possible which alters the blinking period of the icon corresponding to the relevant direction, or changes its color in accordance with the distance the deciding unit 117 outputs.

For example, when giving information that it should travel 10 m ahead, it blinks the icon at 10 Hz, when giving information that it should travel 5 m ahead, it blinks the icon at 5 Hz, and when it comes into the visual field, it turns off the icon. Alternatively, as for the color, when giving information that it should travel 10 m ahead, it can alter the color to red, when giving information that it should travel 5 m ahead, it can alter the color to yellow, and when it comes into the visual field, it can alter the color to green.

In addition, as shown in FIG. 18B, when displaying the notification information for guiding the self vehicle to the position indicated by the distance and direction output from the deciding unit 117 together with the positional information of the self vehicle and the positional information of the surrounding vehicles (other vehicles) (while displaying the relative positions between the self vehicle and the other vehicles), the driver can not only visually confirm the guidance, but also visually and intuitively learn the positions and routes of the other vehicles and the self vehicle.

Furthermore, when outputting the notification information for guidance by speech, it can inform the driver of the distance and direction by voice by providing such a message as "drive 10 meters ahead" or "get over into the right lane" to the driver. Thus guiding the driver by voice enables the driver to confirm the guidance while looking forward.

Incidentally, it goes without saying that it can give information to the driver by a combination of the speech, icon display and display.

As described above, according to the present embodiment 2, it not only informs the driver that the self vehicle is outside the visual field of the surrounding vehicles, but also gives information in such a manner as to guide the self vehicle into the dynamic visual field range. This offers an advantage of being able to aid the driver in carrying out safe driving in addition to the advantages of the embodiment 1.

Embodiment 3

Figure 19:
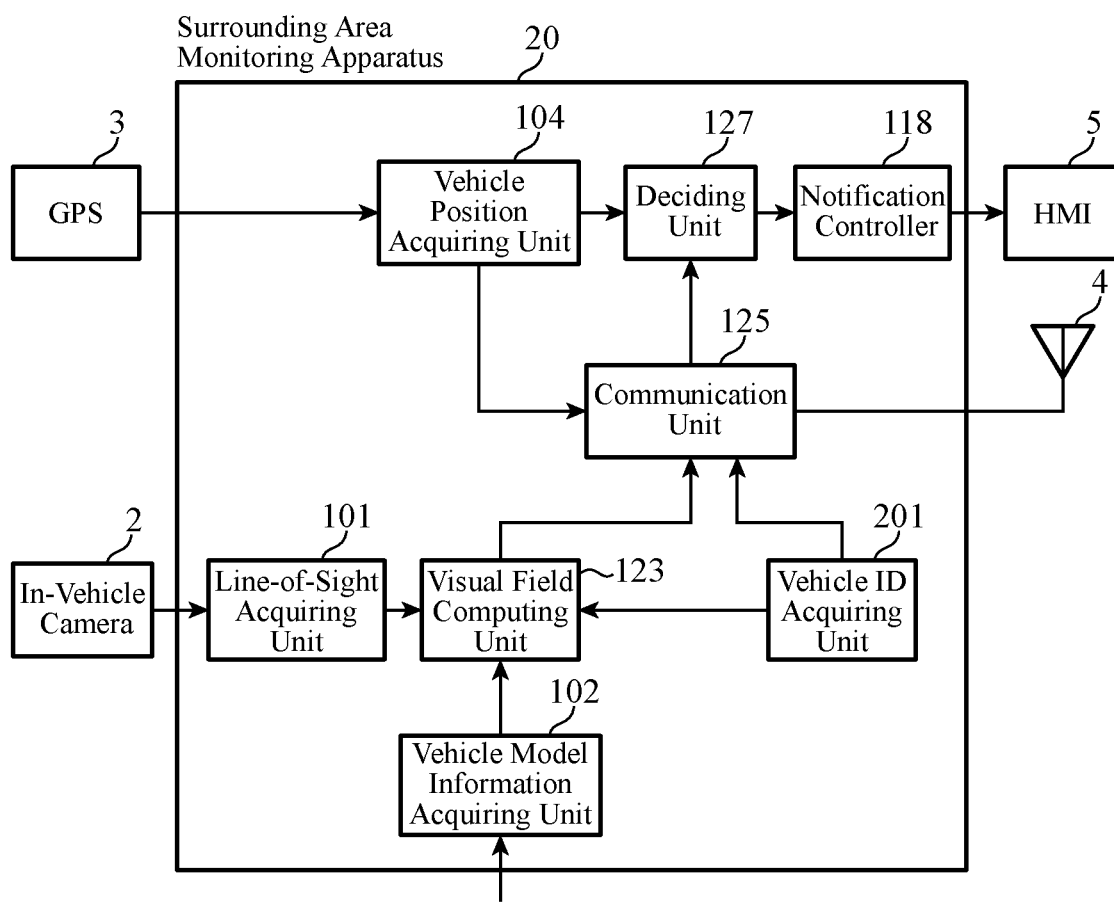
FIG. 19 is a block diagram showing a surrounding area monitoring apparatus of an embodiment 3 and an example of peripheral devices connected thereto.

FIG. 19 is a block diagram showing an example of a surrounding area monitoring apparatus of an embodiment 3 and peripheral devices connected thereto. Incidentally, the same components as those described in the embodiments 1 and 2 are designated by the same reference numerals and their redundant description will be omitted. The surrounding area monitoring apparatus 20 of the embodiment 3 described below differs from the surrounding area monitoring apparatus 10 of the embodiment 2 shown in FIG. 12 in that it further comprises a vehicle ID acquiring unit 201, and in the processing contents of the visual field computing unit 123, communication unit 125 and deciding unit 127.

In the surrounding area monitoring apparatus 1 or 10 of the embodiment 1 or 2, although the visual field computing unit 103 calculates the visual field of the driver, collects and combines the visual fields of several times and supplies to the communication unit 105, in the present embodiment 3, every time the visual field computing unit 123 calculates the visual field of the driver, it supplies it to the communication unit 125 just as it is.

The vehicle ID acquiring unit 201 acquires the ID information unique to the vehicle and supplies it to the communication unit 125.

According to the vehicle model information about the self vehicle acquired by the vehicle model information acquiring unit 102 and the driver's line-of-sight information acquired by the line-of-sight acquiring unit 101, the visual field computing unit 123 calculates the dynamic visual field range of the driver of the self vehicle and outputs it to the communication unit 125.

The communication unit 125 collects the dynamic visual field range of the driver calculated by the visual field computing unit 123, the positional information of the self vehicle acquired by the vehicle position acquiring unit 104, and the vehicle ID acquired by the vehicle ID acquiring unit 201, and transmits them to the surrounding vehicle via the intervehicle communication antenna 4. In addition, the communication unit 125 receives via the intervehicle communication antenna 4 the positional information (latitude and longitude), the visual field information and the vehicle ID a surrounding vehicle of the self vehicle transmits.

Figure 20:
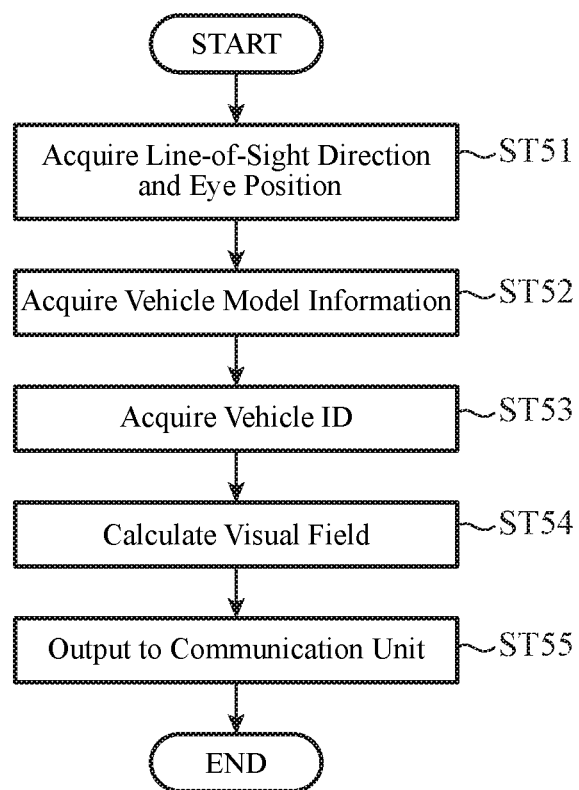
FIG. 20 is a flowchart showing the operation of the visual field computing unit of the surrounding area monitoring apparatus of the embodiment 3.

Next, referring to the flowchart shown in FIG. 20, the operation of the visual field computing unit 123 in the surrounding area monitoring apparatus 20 of the embodiment 3 will be described.

First, the visual field computing unit 123 acquires the line-of-sight direction and the eye position of the driver from the line-of-sight acquiring unit 101 (step ST51). Next, it acquires the vehicle model information about the self vehicle from the vehicle model information acquiring unit 102 (step ST52). Furthermore, it acquires the vehicle ID from the vehicle ID acquiring unit 201 (step ST53).

Then, referring to the visual field table that relates the vehicle model with the line-of-sight directions as shown in FIG. 2, for example, the visual field computing unit 123 calculates the visual field of the driver (step ST54).

For example, if the vehicle model information about the self vehicle acquired at step ST2 is the vehicle model A1 of the manufacturer A and the line-of-sight direction acquired at step ST1 is the rearview mirror, the visual field computing unit 123 can calculate the current visual field as "a1" with reference to the visual field table shown in FIG. 2.

The visual field calculated in this way is output to the communication unit 125 (step ST55).

Figure 21:
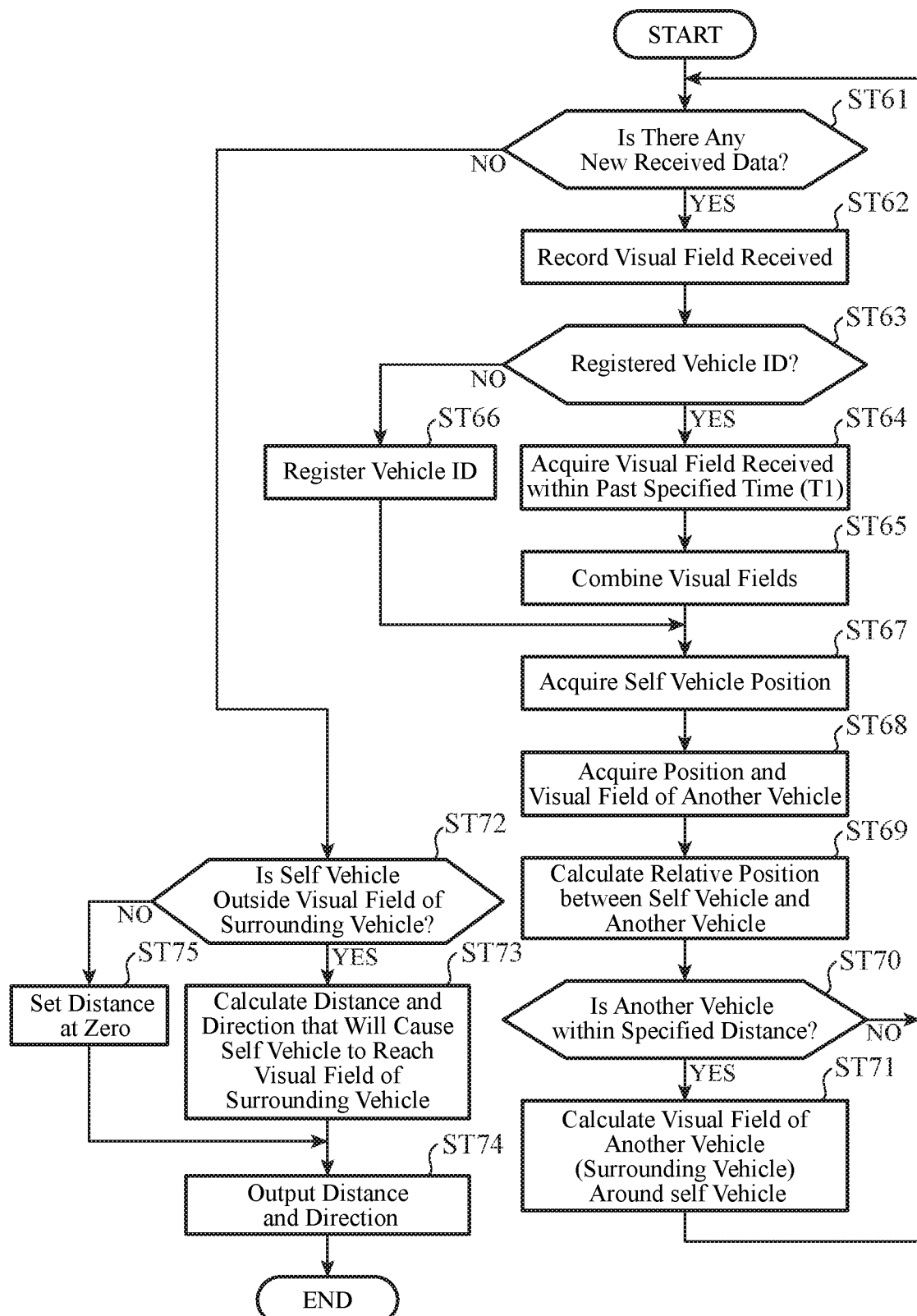
FIG. 21 is a flowchart showing the operation of the deciding unit in the surrounding area monitoring apparatus of the embodiment 3.

Next, referring to the flowchart shown in FIG. 21, the operation of the deciding unit 127 in the surrounding area monitoring apparatus 20 of the embodiment 3 will be described.

First, the deciding unit 127 checks whether or not it is able to receive the information about another vehicle from the communication unit 125 via the intervehicle communication. Then, if it is able to receive the information about new another vehicle, that is, if there is any new received data (step ST61), it records the visual field it receives (step ST62).

Then, the deciding unit 127 checks whether the vehicle ID of the another vehicle received is a registered ID or not (step ST63). If it is the registered ID (YES at step ST63), the deciding unit 127 acquires the visual field it receives within the predetermined specified time (T1) previous to the present (within the past specified time (T1)) (step ST64), and combines the visual field it receives at step ST61 with the past visual field it acquires at step ST64 (step ST65).

On the other hand, unless it is the registered vehicle ID at step ST63 (NO at step ST63), the deciding unit 127 registers the vehicle ID (step ST66).

Figure 13:
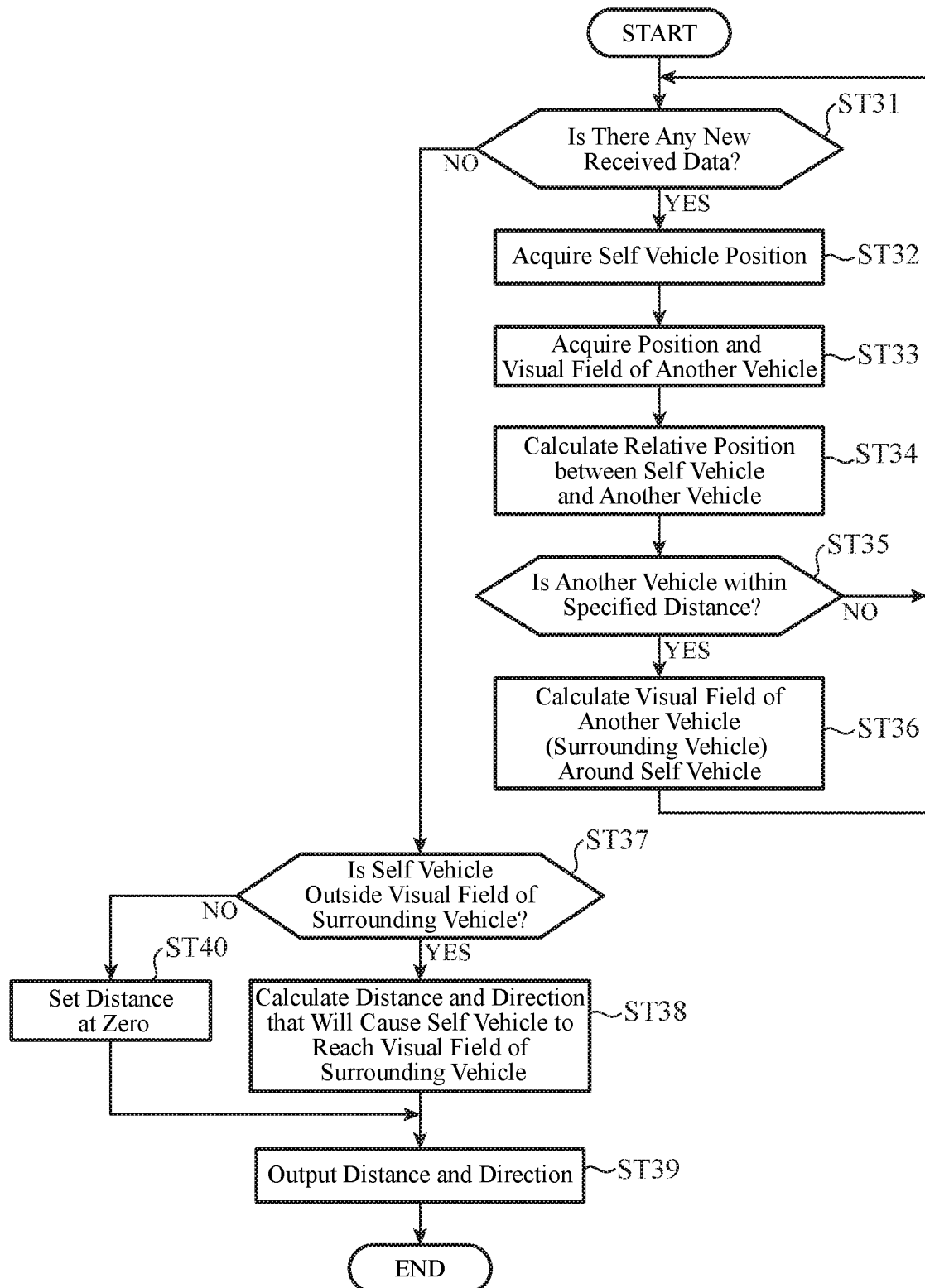
FIG. 13 is a flowchart showing the operation of the deciding unit in the surrounding area monitoring apparatus of the embodiment 2.

Incidentally, as for the processing at the next steps ST67-ST75, since it is the same as the processing of steps ST32-ST40 in the flowchart of FIG. 13 in the embodiment 2, its description will be omitted.

Thus combining the visual fields at the receiving side and setting the past specified time (T1) at any given value will make it possible to combine the dynamic visual field ranges for each vehicle at any given time unit. This enables carrying out more appropriate guidance in accordance with traffic congestion and road conditions, and vehicle conditions such as the speed of a vehicle.

As described above, according to the present embodiment 3, it not only informs that the self vehicle is outside the visual field of the surrounding vehicles, but also gives information that will guide the vehicle into the dynamic visual field range. This offers an advantage of being able to aid the driver to carry out more safe driving in addition to the advantages of the embodiment 1.

Incidentally, although the embodiment 3 described above comprises the vehicle ID acquiring unit 201 in addition to the configuration of the embodiment 2 and alters the processing of the visual field computing unit and deciding unit, it goes without saying that the embodiment 3 can comprise the vehicle ID acquiring unit 201 in addition to the configuration of the embodiment 1, and execute the processing of the embodiment 3 described above.

Incidentally, it is to be understood that a free combination of the individual embodiments, variations of any components of the individual embodiments or removal of any components of the individual embodiments is possible within the scope of the present invention.

INDUSTRIAL APPLICABILITY

A surrounding area monitoring apparatus in accordance with the present invention is applicable to any equipment such as onboard equipment like a car navigation system and dashboard, which is mounted on a vehicle like a car, and is connected to a notification device such as a voice output device and display device. In addition, the surrounding area monitoring apparatus itself can be built into these devices. Furthermore, it can be used in applications installed into a mobile data terminal such as a smartphone, tablet PC and cellular phone.

DESCRIPTION OF REFERENCE SYMBOLS 1, 10, 20 surrounding area monitoring apparatus; 2 in-vehicle camera; 3 GPS; 4 intervehicle communication antenna; 5 HMI; 101 line-of-sight acquiring unit; 102 vehicle model information acquiring unit; 103, 123 visual field computing unit; 104 vehicle position acquiring unit; 105, 125 communication unit; 107, 117, 127 deciding unit; 108, 118 notification controller; 201 vehicle ID acquiring unit.

What is claimed is:
1. A surrounding area monitoring system including a first microcomputer mounted in a first vehicle and a second microcomputer mounted in at least one second vehicle,
  wherein the first microcomputer comprises:
    a first vehicle position acquirer to acquire first positional information of the first vehicle;
    a first visual field range acquirer to acquire first visual field range information of the first vehicle;
    a first communicator to transmit the acquired first positional information of the first vehicle and the acquired first visual field range information of the first vehicle to the at least one second vehicle around the first vehicle;
  wherein the second microcomputer comprises:
    a second vehicle position acquirer to acquire second positional information of the at least one second vehicle;
    a second communicator to receive the first positional information of said first vehicle and the first visual field range information of the first vehicle;
    a decider to decide whether the at least one second vehicle is outside a visual field range of said first vehicle or not, based on the acquired first positional information of the first vehicle, the second positional information of the at least one second vehicle, and the first visual field range of the first vehicle;
    a notification controller to provide an advisory or warning to the at least one second vehicle that the at least one second vehicle is in a blind spot of another vehicle, when the decider decides that the at least one second vehicle is outside the visual field range of said first vehicle.
2. The surrounding area monitoring system according to claim 1,
  wherein the notification controller instructs a notification device to output notification information when the decider decides that the first vehicle is outside the visual field range of the at least one second vehicle.

3. The surrounding area monitoring system according to claim 1, wherein the notification controller instructs the notification device to output the notification information for guiding the first vehicle into a dynamic visual field range of the driver of the at least one second vehicle when the decider decides that the first vehicle is outside the dynamic visual field range of the driver of the at least one second vehicle.

* * * * *